United States Patent
Gresset

(10) Patent No.: US 11,924,844 B2
(45) Date of Patent: Mar. 5, 2024

(54) METHOD AND SERVER CONFIGURED FOR ALLOCATING DOWNLINK TRANSMISSION RESOURCES AND FOR TRANSMITTING OBSTACLE DETECTION ENHANCEMENT DATA, COMPUTER PROGRAM PRODUCT, AND STORAGE MEDIUM

(71) Applicant: MITSUBISHI ELECTRIC CORPORATION, Tokyo (JP)

(72) Inventor: Nicolas Gresset, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 450 days.

(21) Appl. No.: 17/286,900

(22) PCT Filed: Oct. 29, 2019

(86) PCT No.: PCT/JP2019/043177
§ 371 (c)(1),
(2) Date: Apr. 20, 2021

(87) PCT Pub. No.: WO2020/110613
PCT Pub. Date: Jun. 4, 2020

(65) Prior Publication Data
US 2021/0352634 A1    Nov. 11, 2021

(30) Foreign Application Priority Data
Nov. 26, 2018 (EP) ..................... 18208375

(51) Int. Cl.
*H04W 72/23* (2023.01)
*B61L 15/00* (2006.01)
(Continued)

(52) U.S. Cl.
CPC ......... *H04W 72/23* (2023.01); *B61L 15/0027* (2013.01); *B61L 27/57* (2022.01);
(Continued)

(58) Field of Classification Search
CPC ... H04W 72/23; H04W 72/542; H04W 24/02; H04W 28/26; H04W 72/0446;
(Continued)

(56) References Cited

U.S. PATENT DOCUMENTS

2004/0056182 A1* 3/2004 Jamieson ............. B61L 23/34
250/221
2021/0107536 A1* 4/2021 Hania .................... G06V 20/56

OTHER PUBLICATIONS

International Search Report (PCT/ISA/210) issued in PCT/JP2019/043177 dated Feb. 13, 2020.
(Continued)

*Primary Examiner* — Mohammed S Chowdhury
(74) *Attorney, Agent, or Firm* — Birch, Stewart, Kolasch & Birch, LLP

(57) ABSTRACT

Obstacle detection enhancement data are transmitted from a server to at least one moving conveyance embedding an obstacle detection system and an on-board wireless radio unit communicating with the server via wireless link. To do so, downlink transmission resources are allocated to each on-board wireless radio unit in a transmission cycle $C_n$, by optimizing the difference between a distance travelled by the moving conveyance during a transmission cycle and a distance covered by the obstacle detection enhancement data made available to the obstacle detection system at a next transmission cycle $C_{n+1}$, wherein the volume of obstacle detection enhancement data expected to be transmitted during the transmission cycle $C_n$ is determined from volume-to-distance ratio information $b_k$ stored in a database and from actual quality of the wireless link.

14 Claims, 3 Drawing Sheets

(51) Int. Cl.
    *B61L 27/57*           (2022.01)
    *B61L 27/70*           (2022.01)
    *H04L 1/00*            (2006.01)
    *H04L 5/00*            (2006.01)
    *H04W 72/542*        (2023.01)

(52) U.S. Cl.
    CPC ............ *B61L 27/70* (2022.01); *H04L 1/0002* (2013.01); *H04L 1/0026* (2013.01); *H04L 5/0064* (2013.01); *H04W 72/542* (2023.01)

(58) Field of Classification Search
    CPC ..... H04W 72/51; H04W 72/52; H04W 72/54; B61L 15/0027; B61L 27/57; B61L 27/70; B61L 15/0081; B61L 23/002; B61L 23/041; B61L 27/20; H04L 1/0002; H04L 1/0026; H04L 5/0064; H04L 1/0014; H04L 5/0053; H04L 5/0082
    See application file for complete search history.

(56)           References Cited

OTHER PUBLICATIONS

Written Opinion (PCT/ISA/237) issued in PCT/JP2019/043177 dated Feb. 13, 2020.

\* cited by examiner

METHOD AND SERVER CONFIGURED FOR ALLOCATING DOWNLINK TRANSMISSION RESOURCES AND FOR TRANSMITTING OBSTACLE DETECTION ENHANCEMENT DATA, COMPUTER PROGRAM PRODUCT, AND STORAGE MEDIUM

CROSS REFERENCE TO RELATED APPLICATIONS

This application is the National Phase of PCT International Application No. PCT/JP2019/043177, filed on Oct. 29, 2019, which claims priority under 35 U.S.C. § 119(a) to patent application Ser. No. 18/208,375.8, filed in Europe on Nov. 26, 2018, all of which are hereby expressly incorporated by reference into the present application.

TECHNICAL FIELD

The present invention generally relates to adapting downlink transmission resources allocation for transmitting obstacle detection enhancement data from a server to an on-board controller in a moving conveyance and to transmitting the obstacle detection enhancement data from the server to the on-board controller in accordance.

BACKGROUND ART

Moving conveyances, such as trains, can travel on predefined paths, such as railroads, without being driven by a human operator. Such moving conveyances may be automatically controlled using obstacle detection systems. The obstacle detection systems can include passive (visible and/or infrared camcorders), as well as possibly active sensors (radar, laser-scanner, sonar). The obstacle detection systems thus capture information about environment ahead the moving conveyance so as to be able to detect presence of a potential obstacle and, if any, take appropriate countermeasures (reduce the moving conveyances' speed, even stop the moving conveyances, trigger alarm horns . . . ). Similarly such obstacle detection systems may also be used to assist a human operator driving the moving conveyance.

In order to enhance obstacle detection for such moving conveyance travelling on predefined paths (such as railroads), a remote server may be wirelessly connected to an on-board control unit in the moving conveyance. Such a remote server can thus provide obstacle detection enhancement data previously stored in a database connected to said remote server. The obstacle detection enhancement data depend on the location of a considered moving conveyance on a predefined path, and may be descriptors of items surrounding the predefined path, descriptors of active work zones along the predefined path, or any other data tight might be helpful to enable the obstacle detection system to refine obstacle detection decisions. Such obstacle detection enhancement data may be based on 3D-map information. Such a database thus stores a description of the predefined paths on which the moving conveyances are subject to travel, as well as obstacle detection enhancement data associated therewith.

Although it is usual in wireless communications to optimize downlink transmission resources allocation to take into account effective propagation conditions (presence of interferences . . . ), such downlink transmission resources may not be optimized to adequately support such obstacle detection assistance from a remote server. Moreover, it is desirable to perform such downlink transmission resources allocation optimization in a timely efficient manner.

Even though the obstacle detection is able to operate in stand-alone mode, it is more particularly desirable to provide a solution in which downlink transmission resources allocation is optimized so as to improve obstacle detection (e.g., reducing false alarms). It is more particularly desirable to provide a solution that is simple and cost-effective.

SUMMARY OF INVENTION

To that end, the present invention concerns a method for allocating downlink transmission resources for transmitting obstacle detection enhancement data to at least one on-board wireless radio unit of respective at least one moving conveyance travelling on at least one predefined path, each moving conveyance embedding an obstacle detection system and an on-board wireless radio unit communicating with a server via a wireless link, time being divided in transmission cycles $C_n$ wherein n represents a sequence number, the method being performed by the server and comprising, for each moving conveyance: obtaining information about actual speed and location of the moving conveyance on one said predefined path and about actual quality $Q_k$ of the wireless link between the server and the on-board wireless radio unit; and allocating downlink transmission resources to the at least one on-board wireless radio unit during each transmission cycle $C_n$. In addition, the method further comprises, for each moving conveyance: computing a distance $d_k$ travelled by said moving conveyance during one transmission cycle at the actual speed of said moving conveyance; estimating location on said predefined path from which the obstacle detection system would need the obstacle detection enhancement data to be transmitted during the transmission cycle $C_n$, from the actual speed and location of said moving conveyance; requesting to a database storing the obstacle detection enhancement data a volume-to-distance ratio information $b_k$ representing quantity of obstacle detection enhancement data per meter or equivalent information, from said estimated location; determining the downlink transmission resources to be allocated to the on-board wireless radio unit of said moving conveyance during the transmission cycle $C_n$, by optimizing the difference between the distance $d_k$ and a distance $D_k$ that is covered by the obstacle detection enhancement data made available to the obstacle detection system of said moving conveyance at the start of the transmission cycle $C_{n+1}$, wherein the volume of obstacle detection enhancement data expected to be transmitted during the transmission cycle $C_n$ is determined from the volume-to-distance ratio information $b_k$ and from the actual quality $Q_k$ of said wireless link.

Thus, downlink transmission resources allocation is optimized to adequately support obstacle detection assistance from a remote server. Moreover, such optimization of downlink transmission resources allocation is performed in a timely efficient manner by relying on the volume-to-distance ratio information provided by the database.

According to a particular embodiment, the estimated location on said predefined path from which the obstacle detection system would need the obstacle detection enhancement data to be transmitted in the transmission cycle $C_n$ takes into account an estimated braking distance.

Thus, the obstacle detection enhancement data are obtained enough in advance by the obstacle detection system to allow securely stopping the moving conveyance upon obstacle detection.

According to a particular embodiment wherein plural N moving conveyances are considered and wherein optimizing the difference between the distance $d_k$ and the distance $D_k$ is performed under the constraint that the same ratio $D_k/d_k$ is achieved for all the moving conveyances, including determining:

$$R_k = \frac{d_k/K_k}{\sum_{i=1}^{N} d_i/K_i}$$

wherein $R_k$ represents a ratio of downlink transmission resources allocated to the moving conveyance identified by k with respect to a total quantity $R_{tot}$ of downlink transmission resources, wherein $D_k = R_k \cdot K_k$ and $K_k = R_{tot} \cdot f(SNR_k)/b_k$ and wherein $f(SNR_k)$ represents the quality $Q_k$ of the wireless link between the on-board wireless radio unit of the moving conveyance identified by k and the server as a function of signal-to-noise ratio $SNR_k$ on said wireless link.

Thus, an overlap of obstacle detection enhancement data is ensured between successive transmission cycles and, for all the moving conveyances, the same proportion of distance $D_k$ is covered by the obstacle detection enhancement data with respect to the travelled distance $d_k$.

According to a particular embodiment wherein plural N moving conveyances are considered and wherein optimizing the difference between the distance $d_k$ and the distance $D_k$ is performed under the constraint that the same ratio $D_k/d_k$ is achieved for all the moving conveyances, including determining:

$$R_k = \frac{d_k \frac{1 + \sum_{i=1}^{N} DL_i/K_i}{\sum_{i=1}^{N} d_i/K_i} - DL_k}{K_k}$$

wherein $R_k$ represents a ratio of downlink transmission resources allocated to the moving conveyance identified by k with respect to a total quantity $R_{tot}$ of downlink transmission resources, wherein $D_k = DL_k + R_k \cdot K_k$ and $K_k = R_{tot} \cdot f(SNR_k)/b_k$, wherein $DL_k$ represents distance ahead said estimated location, for the moving conveyance identified by k, which is covered by the obstacle detection enhancement data transmitted to the on-board wireless radio unit of said moving conveyance identified by k up to the end of the transmission cycle $C_{n-1}$, and wherein $f(SNR_k)$ represents the quality $Q_k$ of the wireless link between the on-board wireless radio unit of the moving conveyance identified by k and the server as a function of signal-to-noise ratio $SNR_k$ on said wireless link.

Thus, obstacle detection enhancement data are transmitted in an incremental manner, and the same proportion of distance $D_k$ is covered by the obstacle detection enhancement data with respect to the travelled distance $d_k$.

According to a particular embodiment wherein plural N moving conveyances are considered and wherein optimizing the difference between the distance $d_k$ and the distance $D_k$ is performed under the constraint that the same gap $D_k$-$d_k$ is achieved for all the moving conveyances, including determining:

$$R_k = \frac{d_k + \frac{1 - \sum_{i=1}^{N} d_i/K_i}{\sum_{i=1}^{N} 1/K_i}}{K_k}$$

wherein $R_k$ represents a ratio of downlink transmission resources allocated to the moving conveyance identified by k with respect to a total quantity $R_{tot}$ of downlink transmission resources, wherein $D_k = R_k \cdot K_k$ and $K_k = R_{tot} \cdot f(SNR_k)/b_k$ and wherein $f(SNR_k)$ represents the quality $Q_k$ of the wireless link between the on-board wireless radio unit of the moving conveyance identified by k and the server as a function of signal-to-noise ratio $SNR_k$ on said wireless link.

Thus, an overlap of obstacle detection enhancement data is ensured between successive transmission cycles and, for all the moving conveyances, the same overlap applies for all the moving conveyances.

According to a particular embodiment wherein plural N moving conveyances are considered and wherein optimizing the difference between the distance $d_k$ and the distance $D_k$ is performed under the constraint that the same gap $D_k$-$d_k$ is achieved for all the moving conveyances, including determining:

$$R_k = \frac{d_k - DL_k + \frac{1 - \sum_{i=1}^{N}(DL_i - d_i)/K_i}{\sum_{i=1}^{N} 1/K_i}}{K_k}$$

wherein $R_k$ represents a ratio of downlink transmission resources allocated to the moving conveyance identified by k with respect to a total quantity $R_{tot}$ of downlink transmission resources, wherein $D_k = R_k \cdot K_k$ and $K_k = R_{tot} \cdot f(SNR_k)/b_k$ wherein $DL_k$ represents distance ahead said estimated location, for the moving conveyance identified by k, which is covered by the obstacle detection enhancement data transmitted to the on-board wireless radio unit of said moving conveyance identified by k up to the end of the transmission cycle $C_{n-1}$, and wherein $f(SNR_k)$ represents the quality $Q_k$ of the wireless link between the on-board wireless radio unit of the moving conveyance identified by k and the server as a function of signal-to-noise ratio $SNR_k$ on said wireless link.

Thus, obstacle detection enhancement data are transmitted in an incremental manner, and the same quantity of extra obstacle detection data applies for all the moving conveyances.

According to a particular embodiment, the obstacle detection enhancement data are 3D scene descriptors describing samples of a 3D scene of environment surrounding the at least one predefined path. Thus, obstacle detection enhancement data significantly improve obstacle detection in an efficient manner.

The present invention also concerns a method for transmitting obstacle detection enhancement data to at least one on-board wireless radio unit of respective at least one moving conveyance travelling on at least one predefined path, wherein the method is performed by the server and comprises allocating downlink transmission resources as above and further: retrieving from the database the obstacle detection enhancement data to be transmitted in the transmission cycle $C_n$; and when the start of the transmission cycle $C_n$ is reached, transmitting the retrieved obstacle detection enhancement data to the at least one on-board wireless radio unit in the respectively allocated downlink transmission resources.

The present invention also concerns a computer program that can be downloaded from a communication network and/or stored on a non-transitory information storage medium that comprises code instructions that can be read and executed by a processing device such as a microprocessor for causing implementation of the aforementioned method above in any one of its embodiments. The present invention also concerns a non-transitory information storage medium, storing such a computer program.

The present invention also concerns a server configured for allocating downlink transmission resources for transmitting obstacle detection enhancement data to at least one on-board wireless radio unit of respective at least one moving conveyance travelling on at least one predefined path, each moving conveyance embedding an obstacle detection system and an on-board wireless radio unit communicating with a server via a wireless link, time being divided in transmission cycles $C_n$ wherein n represents a sequence number, the server comprising electronic circuitry configured, for each moving conveyance, for: obtaining information about actual speed and location of the moving conveyance on one said predefined path and about actual quality $Q_k$ of the wireless link between the server and the on-board wireless radio unit; and allocating downlink transmission resources to the at least one on-board wireless radio unit during each transmission cycle $C_n$. In addition, the electronic circuitry is further configured, for each moving conveyance, for: computing distance $d_k$ travelled by said moving conveyance during one transmission cycle at the actual speed of said moving conveyance; estimating location on said predefined path from which the obstacle detection system would need the obstacle detection enhancement data to be transmitted during the transmission cycle $C_n$, from the actual speed and location of said moving conveyance; requesting to a database storing the obstacle detection enhancement data a volume-to-distance ratio information $b_k$ representing quantity of obstacle detection enhancement data per meter or equivalent information, from said estimated location; determining the downlink transmission resources to be allocated to the on-board wireless radio unit of said moving conveyance during the transmission cycle $C_n$, by optimizing the difference between the distance $d_k$ and a distance $D_k$ that is covered by the obstacle detection enhancement data made available to the obstacle detection system of said moving conveyance at the start of the transmission cycle $C_{n+1}$, wherein the volume of obstacle detection enhancement data expected to be transmitted during the transmission cycle $C_n$ is determined from the volume-to-distance ratio information $b_k$ and from the actual quality $Q_k$ of said wireless link.

The present invention also concerns a server configured for transmitting obstacle detection enhancement data to at least one on-board wireless radio unit of respective at least one moving conveyance travelling on at least one predefined path, wherein the server is configured as above for allocating downlink transmission resources and wherein the electronic circuitry of said server is further configured for: retrieving from the database the obstacle detection enhancement data to be transmitted in the transmission cycle $C_n$ and, when the start of the transmission cycle $C_n$ is reached, transmitting the retrieved obstacle detection enhancement data to the at least one on-board wireless radio unit in the respectively allocated downlink transmission resources.

The characteristics of the invention will emerge more clearly from a reading of the following description of at least one example of embodiment, said description being produced with reference to the accompanying drawings.

DESCRIPTION OF EMBODIMENTS

Figure 1:
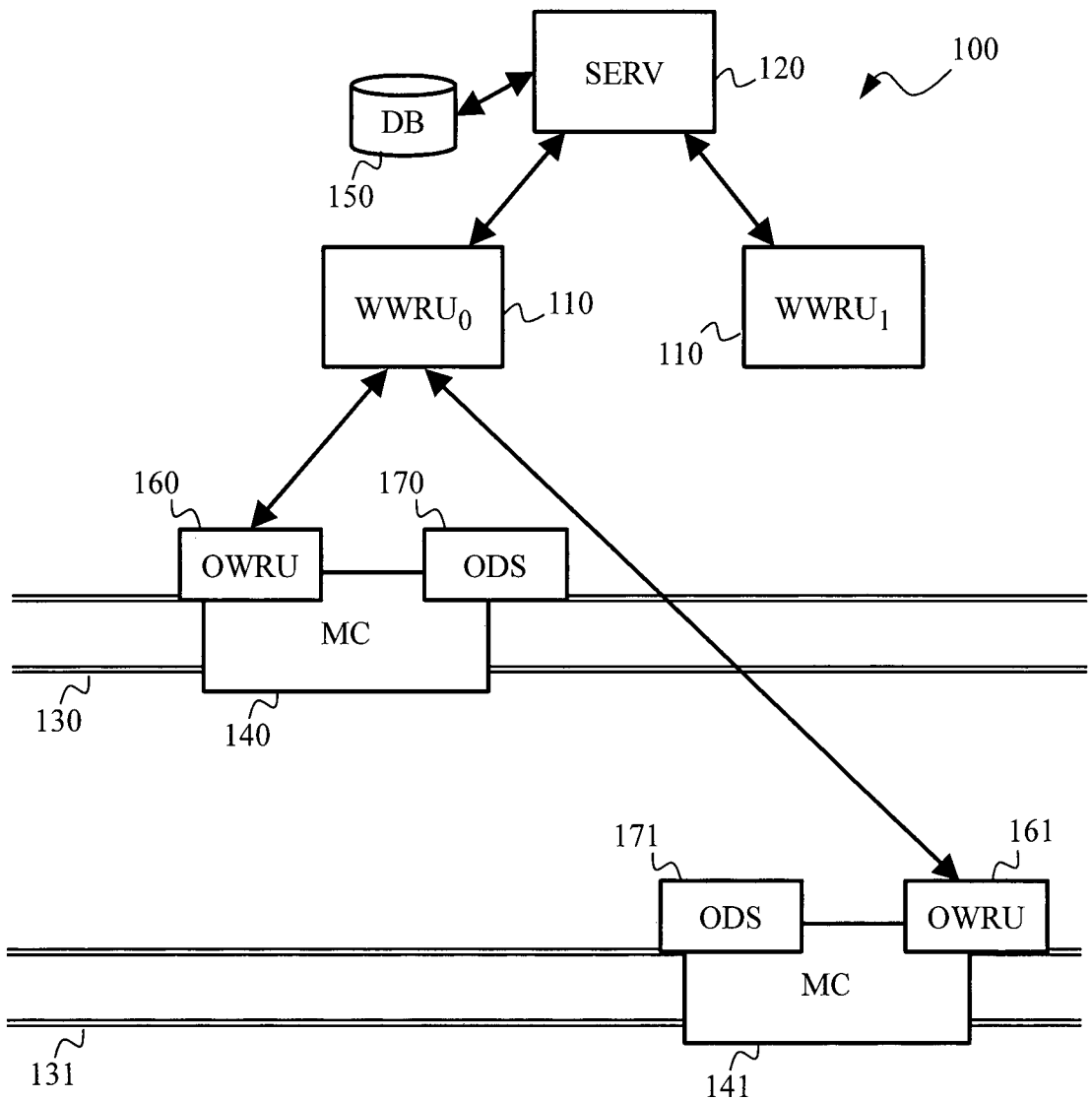
FIG. 1 schematically represents an obstacle detection enhancement system in which the present invention may be implemented.

FIG. 1 schematically represents an obstacle detection enhancement system 100 intended to provide support for improving obstacle detection during journeys of at least one moving conveyance MC 140, 141 along at least one predefined respective path 130, 131. In a preferred embodiment, each said moving conveyance MC 140, 141 is a train and each said predefined path 130, 131 is railways.

The obstacle detection enhancement system 100 comprises a server SERV 120 and an on-board wireless radio unit OWRU 160, 161 located in each moving conveyance MC 140, 141. The server SERV 120 and each on-board wireless radio unit OWRU 160, 161 wirelessly communicate with each other, potentially via wireless radio units such as wayside wireless radio units $WWRU_0$, $WWRU_1$ 110 located along each predefined path 130, 131. The wireless radio units such as the wayside wireless radio units $WWRU_0$, $WWRU_1$ 110 are geographically installed such that wireless communication continuity can be ensured as much as possible between the server SERV 120 and each on-board wireless radio unit OWRU 160, 161 whatever is the effective location of any moving conveyance MC 140, 141 on any one of the predefined path 130, 131.

For example, the wireless radio units such as the wayside wireless radio units $WWRU_0$, $WWRU_1$ 110 are access points of a telecommunication system, for instance an LTE ("Long Term Evolution") telecommunication system or the like. For example, the server SERV 120 is connected to the wireless radio units such as the wayside wireless radio units $WWRU_0$, $WWRU_1$ 110 using copper wires or optical links.

The server SERV 120 knows, for instance by configuration, on which predefined respective path 130, 131 each moving conveyance MC 140, 141 currently travels.

Each moving conveyance MC 140, 141 embeds a respective obstacle detection system ODS 170, 171. The obstacle detection system ODS 170, 171 can include passive (visible and/or infrared camcorders), as well as possibly active sensors (radar, laser-scanner, sonar). The obstacle detection system ODS 170, 171 thus captures information about environment ahead the moving conveyance so as to be able to detect presence of an obstacle and, if any, take appropriate countermeasures. When the moving conveyance MC 140, 141 is automatically driven, the obstacle detection system ODS 170, 171 may instruct the moving conveyance MC 140, 141 to perform emergency break in order to avoid potential collision. When the moving conveyance MC 140, 141 is driven by a human operator, the obstacle detection system ODS 170, 171 may provide emergency warning signals to indicate the human operator that emergency procedure shall be activated in order to avoid potential collision.

In order to enhance obstacle detection performance, the obstacle detection system ODS 170, 171 communicates with the server SERV 120 via the respective on-board wireless radio unit OWRU 160, 161. The server SERV 120 thus provides obstacle detection enhancement data to the obstacle detection system ODS 170, 171 so as to speed up obstacle detection processing and/or to reduce ratio of false alarm occurrences. False alarms occur when the obstacle detection system ODS 170, 171 erroneously detects collision risks ahead the corresponding moving conveyance.

For example, the obstacle detection enhancement data are descriptors of physical items (buildings, trees, work areas . . . ) known to be present in the vicinity of the corresponding predefined path 130, 131 ahead the effective location of the moving conveyance MC 140, 141 in question. In a particular embodiment, the obstacle detection enhancement data are 3D scene descriptors describing samples of a 3D scene of environment surrounding the corresponding predefined path 130, 131. Such a 3D scene is for instance obtained from 3D modelling of video images captured by a camera installed on the front of a moving conveyance MC during training journeys on the corresponding predefined path 130, 131. The samples in question can thus be polytopes extracted from the 3D modelling.

Such obstacle detection enhancement data allows the obstacle detection system ODS 170, 171 to refine decision regarding the potential obstacle character of objects detected by the obstacle detection system ODS 170, 171 ahead the moving conveyance MC 140, 141 in question.

In order to store such obstacle detection enhancement data, the assistance system 100 further includes a database DB 150 used to store a description of the predefined path 130, 131 as well as obstacle detection enhancement data associated therewith. The database DB 150 is used by the server SERV 120 to retrieve obstacle detection enhancement data per segments of the predefined path 130, 131. Some segments of the predefined path 130, 131 may imply more or less obstacle detection enhancement data than others. Indeed, the surrounding environment may for example be more complex to describe for some segments of the predefined path 130, 131 than for others.

Even though the obstacle detection system ODS 170, 171 should be able to perform obstacle detection without requiring the obstacle detection enhancement data, it is of interest to be able to transmit to the on-board wireless radio unit OWRU 160, 161 as much obstacle detection enhancement data as available in the database DB 150. Therefore, downlink transmission resources should be allocated by the server SERV 120 to allow wirelessly transmitting from the server SERV 120 to the on-board wireless radio unit OWRU 160, 161 as much obstacle detection enhancement data as possible in view of the obstacle detection enhancement data effectively available in the database DB 150.

To do so, the database DB 150 provides volume-to-distance ratio information $b_k$, which represents quantity of obstacle detection enhancement data per meter, or equivalent information, along the predefined path 130, 131, wherein k identifies the considered moving conveyance MC 140, 141. The volume-to-distance ratio information $b_k$ depends in which portion of the predefined path 130, 131 is located the moving conveyance MC 140, 141 in question. The volume-to-distance ratio information $b_k$ is an application pre-requisite and is provided by the database DB 150 to the server SERV 120 from information about actual location of the moving conveyance MC 140, 141 on the predefined path 130, 131 and preferably from information about the actual speed of the moving conveyance MC 140, 141. The server SERV 120 performs downlink transmission resources allocation by taking into account such volume-to-distance ratio information $b_k$, as detailed hereafter with respect to FIG. 3.

As detailed hereafter, downlink transmission resources allocation further depends on the actual speed of the moving conveyance MC 140, 141 in question. And in a conventional manner, the downlink transmission resources allocation further depends on quality (e.g., signal-to-noise ratio SNR) of wireless link between the on-board wireless radio unit OWRU 160, 161 in question and the server SERV 120, namely on propagation conditions of wireless signals over said wireless link.

As detailed hereafter, downlink transmission resources allocation may further take into account that downlink transmission resources have to be shared with other on-board wireless radio units OWRU of other respective moving conveyances MC.

Downlink transmission resources allocation is performed by the server SERV 120 on a per-cycle basis. Time is thus divided in transmission cycles of equal duration T, one frame being transmitted from the server SERV 120 to the on-board wireless radio unit OWRU 160, 161 in question at each transmission cycle. Downlink transmission resources are then time and frequency resources within said transmission cycles, and the total quantity of downlink transmission resources per transmission cycle is herein denoted $R_{tot}$. Each downlink transmission resource considers a contiguous slice of time and frequency band. If signal to noise ratio of the transmission is denoted SNR, the transmission throughput over a single downlink transmission resource out of $R_{tot}$ is given by the function $f(SNR)$ in bits per second. Transmission throughput over a ratio R of resources among $R_{tot}$ is given by $R_{tot} \cdot R \cdot f(SNR)$ in bits per second. For example, the function $f(\ )$ is chosen as the Shannon Capacity formula $f(SNR)=BW_R \cdot T_R/T \cdot \log_2(1+SNR)$, wherein $BW_R$ is the frequency bandwidth of each downlink transmission resource in Hertz and $T_R$ is the time duration of each downlink transmission resource in seconds. In another example, look up tables of the wireless physical layer transmissions system are obtained beforehand and allow to substitute $\log_2(1+SNR)$ in the expression of $f(SNR)$ by values closest to expected performance.

During a transmission cycle $C_n$ (wherein n is a transmission cycle sequence number), the on-board wireless radio unit OWRU 160, 161 in question receives obstacle detection enhancement data for a portion of the predefined path 130, 131 on which the considered moving conveyance MC 140, 141 travels which is at a certain distance ahead said considered moving conveyance MC 140, 141. This is illustratively shown in FIGS. 5A, 5B and 5C in three different scenarios.

Figure 5A:
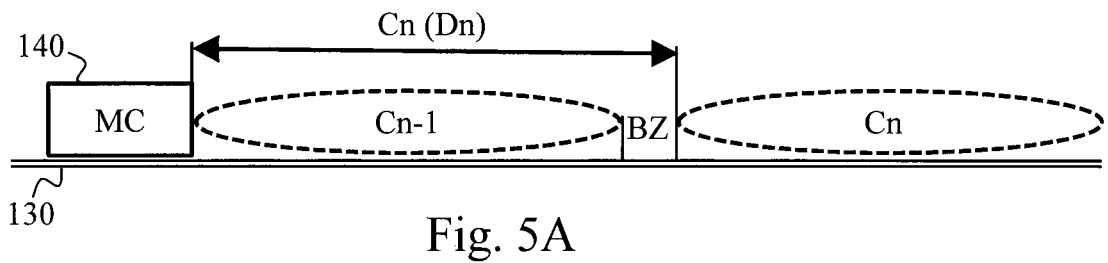
FIG. 5A schematically represents a first obstacle detection enhancement scenario.

In FIG. 5A, when starts the transmission cycle $C_n$, the on-board wireless radio unit OWRU 160, 161 of the considered moving conveyance MC 140, 141 has received in the transmission cycle $C_{n-1}$ the obstacle detection enhancement data that are to be used by the obstacle detection system ODS 170, 171 for the distance $D_k$ travelled by the moving conveyance MC 140, 141 during the transmission cycle $C_n$. Then, when starts the transmission cycle $C_{n+1}$, the on-board wireless radio unit OWRU 160, 161 of the considered moving conveyance MC 140, 141 has received in the transmission cycle $C_n$ the obstacle detection enhancement data that are to be used by the obstacle detection system ODS 170, 171 for the distance $D_k$ travelled by the moving conveyance MC 140, 141 during the transmission cycle $C_{n+1}$. When not enough downlink transmission resources were allocated in the transmission cycle $C_{n-1}$ to transmit all obstacle enhancement data available in the database DB 150 for the portion travelled by the moving conveyance MC 140, 141 during the transmission cycle $C_n$, a blind zone BZ exists on the predefined path 130, 131. Such a blind zone BZ is thus a portion of the predefined path 130, 131 for which no obstacle enhancement data could have been transmitted to the on-board wireless radio unit OWRU 160, 161 due to lack of downlink transmission resources. It is thus of interest that such blind zones BZ are avoided. As a remark, the following two statements allow avoiding or at least reducing such a blind zone BZ:

(1) when the moving conveyance MC 140, 141 moves at lower speed, the distance travelled per transmission cycle is shorter, which is beneficial for volume of obstacle enhancement data over a fixed distance;
(2) when downlink transmission data rate is increased, volume of obstacle enhancement data is increased per transmission cycle for a fixed distance on the predefined path 130, 131.

Therefore, by adequately performing downlink transmission resources allocation, an overlap O can even be created between obstacle detection enhancement data transmitted in consecutive transmission cycles. Such an overlap allows easily compensating variations of speed of the moving conveyance MC 140, 141 from one transmission cycle to a following one. Furthermore, the distance $D_k$ travelled by the moving conveyance MC 140, 141 during the transmission cycle $C_n$ might be smaller than the distance ahead the moving conveyance MC 140, 141 on which the obstacle detection can be performed. It is also beneficial for the obstacle detection to get the newest obstacle detection enhancement data from the database, especially when the obstacle detection enhancement data in the database includes dynamic data. In this case, the overlap O is beneficial.

Figure 5B:
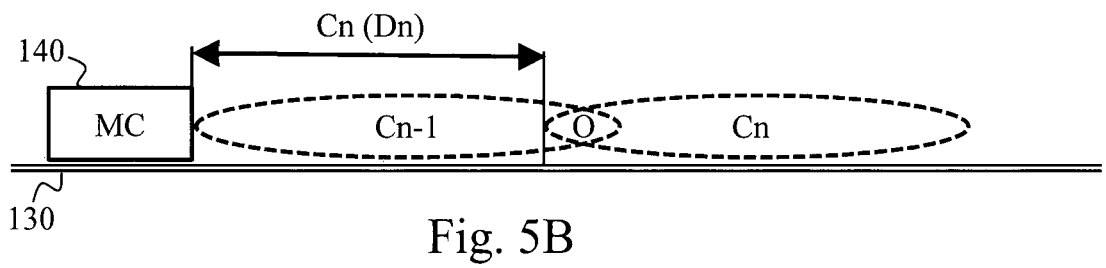
FIG. 5B schematically represents a second obstacle detection enhancement scenario.
Figure 5C:
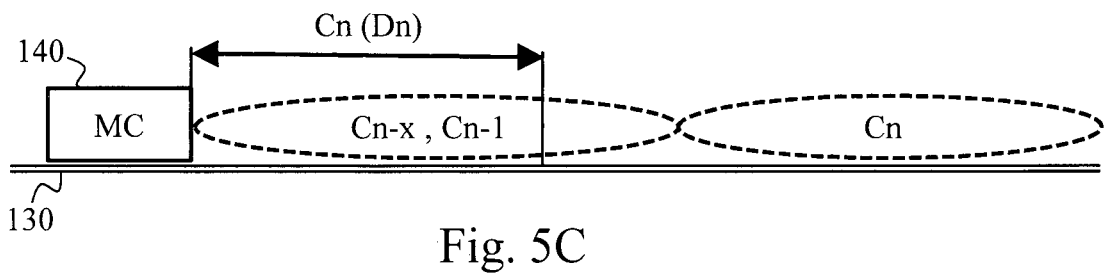
FIG. 5C schematically represents a third obstacle detection enhancement scenario.

This scenario is illustratively represented in FIG. 5B. In such a scenario, the obstacle detection enhancement data received by the on-board wireless radio unit OWRU 160, 161 of the considered moving conveyance MC 140, 141 in the transmission cycle $C_{n-1}$ covers more than the distance $D_n$. Extra obstacle detection enhancement data received during the transmission cycle $C_{n-1}$ are used by the obstacle detection system ODS 170, 171 during the transmission cycle $C_{n+1}$. The obstacle detection enhancement data received by the on-board wireless radio unit OWRU 160, 161 of the considered moving conveyance MC 140, 141 in the transmission cycle $C_n$ overlap with the obstacle detection enhancement data received by the on-board wireless radio unit OWRU 160, 161 of the considered moving conveyance MC 140, 141 in the transmission cycle $C_{n-1}$. Said extra obstacle detection enhancement data received during the transmission cycle $C_{n-1}$ are thus also present in the obstacle detection enhancement data received during the transmission cycle $C_n$. By definition, ensuring that such an overlap O exists ensures that there is no blind zone BZ. This approach is referred herein to as "overlapping mode".

Another approach is to forbid overlapping. The server SERV 120 does not transmit again obstacle detection enhancement data that were already transmitted to the on-board wireless radio unit OWRU 160, 161 of the considered moving conveyance MC 140, 141. As overlapping mode, it allows easily compensating variations of speed of the moving conveyance MC 140, 141 from one transmission cycle to a following one, but with slightly more complex but without redundancy. This scenario is illustratively represented in FIG. 5C. In order to avoid blind zones BZ, the obstacle detection enhancement data received by the on-board wireless radio unit OWRU 160, 161 of the considered moving conveyance MC 140, 141 up to the end of the transmission cycle $C_{n-1}$ shall include all obstacle detection enhancement data that have to be processed by the corresponding obstacle detection system ODS 170, 171 up to the end of the transmission cycle $C_n$. This approach is referred herein to as "incremental mode".

Figure 3:
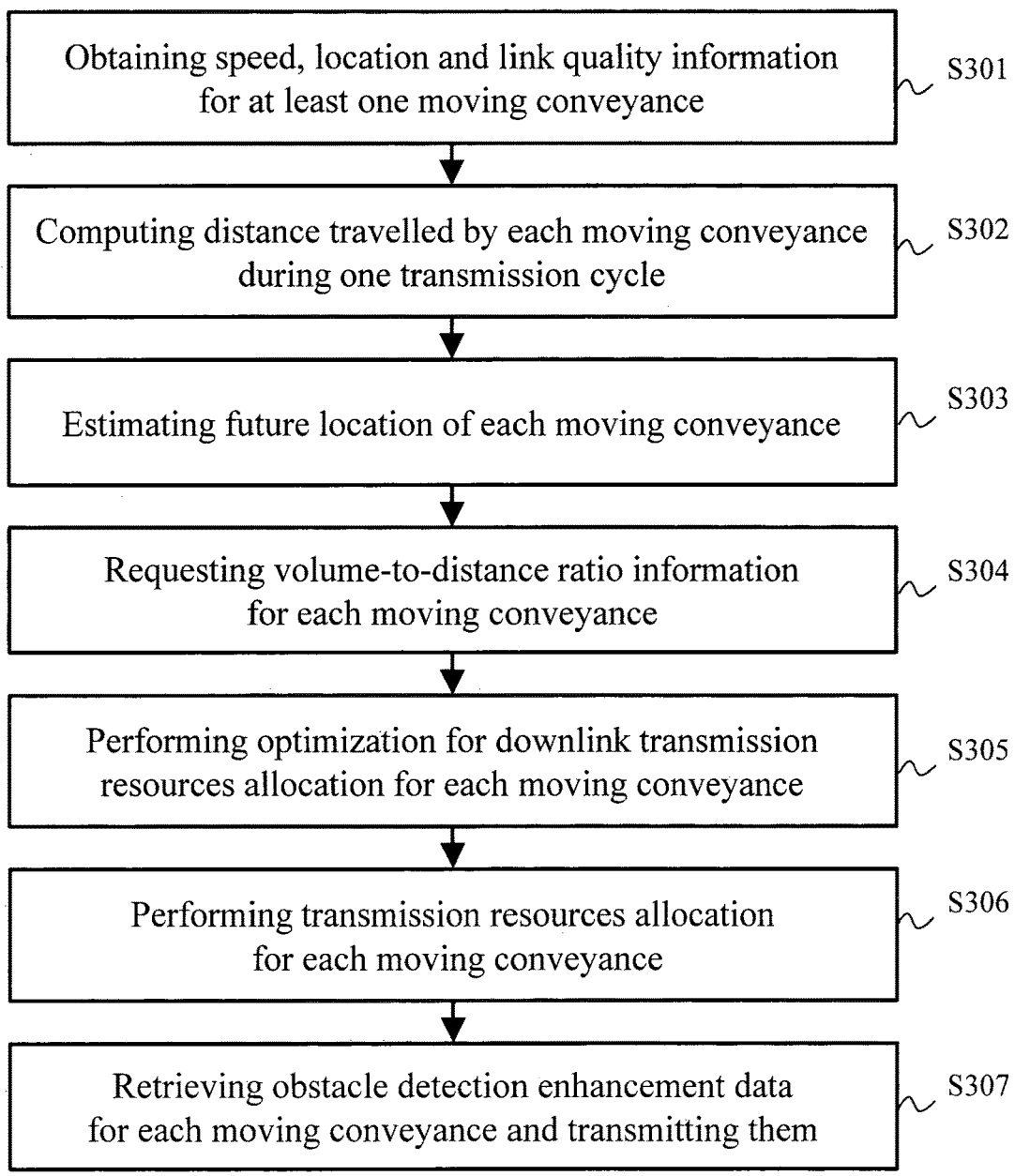
FIG. 3 schematically represents an algorithm for allocating downlink transmission resources and for transmitting obstacle detection enhancement data in accordance.

Optimization of downlink transmission resources allocation may be differently performed according to whether the "overlapping mode" or the "incremental mode" is in use, as detailed hereafter with respect to FIG. 3.

Figure 2:
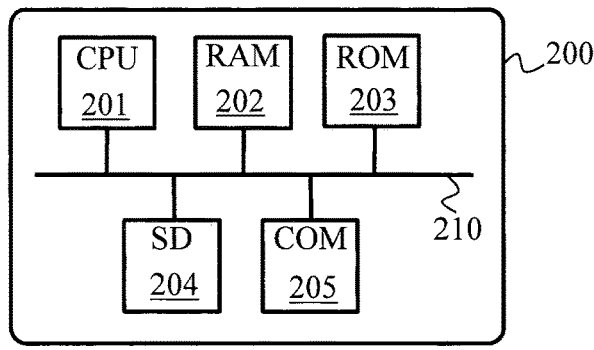
FIG. 2 schematically represents an example of hardware architecture of a processing device of the obstacle detection enhancement system.

FIG. 2 schematically represents an example of hardware architecture of a processing device 200 of the obstacle detection enhancement system 100. The on-board wireless radio unit OWRU 160, 161 and/or or the obstacle detection system ODS 170, 171 and/or the server SERV 120 can be built on the basis of such example of hardware architecture.

According to the shown example of hardware architecture, the processing device 200 comprises at least the following components interconnected by a communications bus 210: a processor, microprocessor, microcontroller or CPU (Central Processing Unit) 201; a RAM (Random-Access Memory) 202; a ROM (Read-Only Memory) 203; an HDD (Hard-Disk Drive) or an SD (Secure Digital) card reader 204, or any other device adapted to read information stored on non-transitory information storage medium; at least one communication interface COM 205.

When the hardware architecture concerns the server SERV 120, the at least one communication interface COM 205 enables the server SERV 120 to communicate with the wayside wireless radio units $WWRU_0$, $WWRU_1$ 110. In a variant, the at least one communication interface COM 205 enables the server SERV 120 to wirelessly communicate directly with the on-board wireless radio unit OWRU 160, 161.

When the hardware architecture concerns the on-board wireless radio unit OWRU 160, 161, the at least one communication interface COM 205 enables the on-board wireless radio unit OWRU 160, 161 to wirelessly communicate with the wayside wireless radio units $WWRU_0$, $WWRU_1$ 110 and to communicate with the obstacle detection system 170, 171 of the same moving conveyance MC 140, 141. In a variant, the at least one communication interface COM 205 enables the on-board wireless radio unit OWRU 160, 161 to wirelessly communicate directly with the server SERV 120 instead of with the wayside wireless radio units $WWRU_0$, $WWRU_1$ 110.

When the hardware architecture concerns the obstacle detection system ODS 170, 171, the communication interface COM 205 enables the obstacle detection system ODS 170, 171 to communicate with the on-board wireless radio unit OWRU 160, 161 of the same moving conveyance MC 140, 141.

CPU 201 is capable of executing instructions loaded into RAM 202 from ROM 203 or from an external memory, such as an SD card via the SD card reader 204. After the processing device 200 has been powered on, CPU 201 is capable of reading instructions from RAM 202 and executing these instructions. The instructions form one computer program that causes CPU 201 to perform some or all of the steps of the algorithms described herein with respect to the processing device 200 in question.

Consequently, it is understood that any and all steps of the algorithm described herein may be implemented in software form by execution of a set of instructions or program by a programmable computing machine, such as a PC (Personal Computer), a DSP (Digital Signal Processor) or a microcontroller; or else implemented in hardware form by a machine or a dedicated chip or chipset, such as an FPGA (Field-Programmable Gate Array) or an ASIC (Application-Specific Integrated Circuit). In general, the server SERV 120, the on-board wireless radio unit OWRU 160, 161 and the obstacle detection system ODS 170, 171 comprise processing electronics circuitry adapted and configured for implementing the relevant steps as described herein with respect to the processing device in question.

FIG. 3 schematically represents an algorithm for allocating downlink transmission resources and for transmitting obstacle detection enhancement data in accordance. The algorithm of FIG. 3 is implemented by the server SERV 120 and aims at allocating downlink transmission resources for a transmission cycle $C_n$.

In a step S301, the server SERV 120 obtains information on actual speed of at least one moving conveyance MC 140, 141. The information on actual speed of the at least one moving conveyance MC 140, 141 is provided by the on-board wireless radio unit OWRU 160, 161 of the concerned moving conveyance MC 140, 141.

The server SERV 120 further obtains information on actual location of the concerned moving conveyance MC 140, 141 on the predefined path 130, 131 on which said moving conveyance MC 140, 141 is travelling. The information on actual location of the at least one moving conveyance MC 140, 141 may be provided by the on-board wireless radio unit OWRU 160, 161 of the concerned moving conveyance MC 140, 141. Information on actual location of the at least one moving conveyance MC 140, 141 may in a variant be provided to the server SERV 120 by wayside conveyance (e.g., train) detection system.

The server SERV 120 further obtains information on actual quality $Q_k$ of the wireless link between the server SERV 120 and the on-board wireless radio unit OWRU 160, 161 of the concerned moving conveyance MC 140, 141. Such information on actual quality $Q_k$ of said wireless link may be obtained by the server SERV 120 by measuring signal-to-noise ratio $SNR_k$ of wireless signals received from said on-board wireless radio unit OWRU 160, 161, when the server SERV 120 directly communicates wirelessly with said on-board wireless radio unit OWRU 160, 161. Such information on actual quality $Q_k$ of said wireless link may in a variant be obtained by the server SERV 120 from the wayside wireless radio units $WWRU_0$, $WWRU_1$ 110 having measured signal-to-noise ratio $SNR_k$ of wireless signals received from said on-board wireless radio unit OWRU 160, 161, when the wayside wireless radio units $WWRU_0$, $WWRU_1$ 110 act as relays between the server SERV 120 and said on-board wireless radio unit OWRU 160, 161. Such information on actual quality $Q_k$ of said wireless link may in another variant be obtained by the server SERV 120 from said on-board wireless radio unit OWRU 160, 161 having measured signal-to-noise ratio $SNR_k$ of wireless signals received from the server SERV 120, when the server SERV 120 directly communicate wirelessly with said on-board wireless radio unit OWRU 160, 161. Such information on actual quality $Q_k$ of said wireless link may in another variant be obtained by the server SERV 120 from said on-board wireless radio unit OWRU 160, 161, considering that propagation conditions are similar in both directions of the wireless link in question.

In a step S302, the server SERV 120 determines, as function of the actual speed of the at least one moving conveyance MC 140, 141, what distance $d_k$ is travelled by the at least one moving conveyance MC 140, 141 during one transmission cycle of duration T.

In a step S303, from the actual speed and location of the at least one moving conveyance MC 140, 141, the server SERV 120 estimates what is the (future) location on the predefined path 130, 131 from which the obstacle detection system ODS 170, 171 would need the obstacle detection enhancement data expected to be transmitted during the transmission cycle $C_n$. The position estimation may take into account an estimated braking distance BD. The estimated braking distance BD depends on the actual speed of the moving conveyance MC 140, 141 and may be obtained from a braking model as a function of the actual speed of the moving conveyance MC 140, 141.

In a step S304, the server SERV 120 obtains the volume-to-distance ratio information $b_k$ to be applied for the transmission cycle $C_n$. The server SERV 120 requests said volume-to-distance ratio information $b_k$ to the database DB 150. To do so, the server SERV 120 provides the aforementioned estimated location on the predefined path 130, 131 and preferably the actual speed of the moving conveyance MC 140, 141.

The database DB 150 may store the volume-to-distance ratio information $b_k$ on a per cluster basis. Each predefined path 130, 131 is divided into successive clusters, i.e., path segments. For each cluster, the volume-to-distance ratio information $b_k$ is defined as an average ratio of obstacle detection enhancement data per meter, or equivalent information, over said cluster. The volume-to-distance ratio information $b_k$ may in a variant be defined as a maximum ratio of obstacle detection enhancement data per meter, or equivalent information, over said cluster. The volume-to-distance ratio information $b_k$ may in a variant be defined as an intermediate value between said average ratio and said maximum ratio. When the server SERV 120 only provides information on position on the predefined path 130, 131, the database DB 150 returns the volume-to-distance ratio information $b_k$ defined for the cluster to which said position belongs. When the server SERV 120 provides information on position on the predefined path 130, 131 as well as a speed information, the database DB 150 determines a theoretical distance value $D_t$ which is the distance travelled during the duration T of the transmission cycles multiplied by said speed, retrieves the volume-to-distance ratio information $b_k$ stored for each cluster over said theoretical distance $D_t$ from said location, and returns an average value of volume-to-distance ratio information $b_k$ over said theoretical distance $D_t$.

In a step S305, the server SERV 120 determines downlink transmission resources to be allocated to the at least one on-board wireless radio unit OWRU 160, 161 of the respective at least one moving conveyance MC 140, 141, by optimizing the difference between the distance $d_k$ and a distance $D_k$ that is covered by the obstacle detection enhancement data made available to the at least one obstacle detection system ODS 170, 171 at the start of the transmission cycle $C_{n+1}$, wherein the volume of obstacle detection enhancement data expected to be transmitted by the server SERV 120 to the at least one on-board wireless radio unit OWRU 160, 161 of the respective at least one moving conveyance MC 140, 141 during the transmission cycle $C_n$ is determined from the volume-to-distance ratio information $b_k$ for the at least one moving conveyance MC 140, 141 and from the actual quality $Q_k$ of the wireless link between the server SERV 120 and the at least one on-board wireless radio unit OWRU 160, 161 of the respective at least one moving conveyance MC 140, 141. Indeed, the actual quality $Q_k$ of the wireless link in question defines which room is left for transmitting useful payload in the allocated downlink transmission resources. Using the volume-to-distance ratio information $b_k$ for determining the downlink transmission resources to be allocated allows speeding up the downlink transmission resources allocation process. Moreover, by optimizing the difference between the distance $d_k$ and a distance $D_k$, blind zones BZ are avoided. Obviously, blind zones BZ cannot be avoided when the total quantity $R_{tot}$ of downlink transmission resources is insufficient for transmitting the obstacle detection enhancement data, and in this case, as much downlink transmission resources as available are allocated so as to provide as much obstacle detection enhancement data as possible so as to limit the size of such blind zones BZ.

In a particular embodiment, when the server SERV 120 detects that such blind zones BZ appears, the server SERV 120 informs, via the one on-board wireless radio unit OWRU 160, 161, a controller of the respective moving conveyance MC 140, 141 that the speed of said moving conveyance MC 140, 141 should be reduced in order to fully benefit from the obstacle detection enhancement data stored in the database DB 150.

One should note that, as detailed hereafter in particular embodiments, the difference between the distance $d_k$ and the distance $D_k$ can be expressed as a ratio $D_k/d_k$ or as a gap $D_k-d_k$.

In a particular embodiment where one moving conveyance MC 140, 141 is considered and further where the overlapping mode is used, downlink transmission resources allocation ensures that a minimum overlap O is provided between successive transmission cycles. Optimizing the difference between the distance $d_k$ and a distance $D_k$ is thus performed under the constraint that such a minimum overlap O is achieved (as far as the total quantity $R_{tot}$ of downlink transmission resources is sufficient to enable thereto). The same principle can be applied with a null overlap O. Preferably, the minimum downlink transmission resources to meet the constraint are thus allocated, so that remaining downlink transmission resources may be used for other purpose, e.g. for best effort traffic.

In a particular embodiment where one moving conveyance MC 140, 141 is considered and further where the incremental mode is used, downlink transmission resources allocation ensures that no blind zone BZ appears between successive transmission cycles $C_{n+1}$. Optimizing the difference between the distance $d_k$ and a distance $D_k$ is thus performed under the constraint that the obstacle detection enhancement data made available to the at least one obstacle detection system ODS 170, 171 at the start of the transmission cycle $C_{n+1}$ covers the distance travelled by said moving conveyance MC 140, 141 during the transmission cycle $C_{n+1}$. Preferably, the minimum downlink transmission resources to meet the constraint are thus allocated, so that remaining downlink transmission resources may be used for other purpose, e.g. for best effort traffic.

In a particular embodiment where plural moving conveyances MC 140, 141 are considered and further where the overlapping mode is used, optimizing the difference between the distance $d_k$ and the distance $D_k$ is performed under the constraint that the same ratio $D_k/d_k$ is achieved for all the moving conveyances MC 140, 141. This constraint means that, for all the moving conveyances MC 140, 141, the same proportion of distance $D_k$ is covered by the obstacle detection enhancement data with respect to the travelled distance $d_k$. This might be expressed as the following optimization problem:

$$\max_{\{R_k\}} \min_k (D_k/d_k) \text{ such that } \sum_{i=1}^{N} R_i = 1$$

wherein N represents the quantity of moving conveyances MC 140, 141 and $R_k$ represents the ratio of downlink transmission resources $DR_k$ allocated to the moving conveyance MC 140, 141 identified by k with respect to the total quantity $R_{tot}$ of downlink transmission resources. Considering that $D_k = R_k \cdot K_k$, wherein $K_k = R_{tot} \cdot f(SNR_k)/b_k$ represents the distance that would be covered by the obstacle detection enhancement data transmitted during the transmission cycle $C_n$ for the considered moving conveyance MC 140, 141 (identified by k) in the case where all the $R_{tot}$ of downlink transmission resources were allocated to the on-board wireless radio unit OWRU 160, 161 of said considered moving conveyance MC 140, 141 (identified by k), and wherein $f(SNR_k)$ represents the quality $Q_k$ of the wireless link between the on-board wireless radio unit OWRU 160, 161 of said considered moving conveyance MC 140, 141 (identified by k) and the server SERV 120, then solving the optimization problem leads to:

$$R_k = \frac{d_k/K_k}{\sum_{i=1}^{N} d_i/K_i}.$$

In a particular embodiment where plural moving conveyances MC 140, 141 are considered and further where the incremental mode is used, optimizing the difference between the distance $d_k$ and the distance $D_k$ is also performed under the constraint that the same ratio $D_k/d_k$ is achieved for all the moving conveyances MC 140, 141, which also leads to the following optimization problem:

$$\max_{\{R_k\}} \min_k (D_k/d_k) \text{ such that } \sum_{i=1}^{N} R_i = 1.$$

However, in this case, $D_k = DL_k + R_k \cdot K_k$, wherein $DL_k$ represents the distance ahead the estimated location (see the step S303)—for the considered moving conveyance MC 140, 141 (identified by k)—which is covered by the obstacle detection enhancement data transmitted to the on-board wireless radio unit OWRU 160, 161 of the considered moving conveyance MC 140, 141 up to the end of the transmission cycle $C_{n-1}$. Then solving the optimization problem leads to:

$$R_k = \frac{d_k \frac{1 + \sum_{i=1}^{N} DL_i/K_i}{\sum_{i=1}^{N} d_i/K_i} - DL_k}{K_k}.$$

In a particular embodiment where plural moving conveyances MC 140, 141 are considered and further where the overlapping mode is used, optimizing the difference between the distance $d_k$ and the distance $D_k$ is performed under the constraint that the same gap $D_k$–$d_k$ is achieved for all the moving conveyances MC 140, 141. This constraint means that the same overlap O is applied for all the moving conveyances MC 140, 141. This might be expressed as the following optimization problem:

$$\max_{\{R_k\}} \min_k (D_k - d_k) \text{ such that } \sum_{i=1}^{N} R_i = 1.$$

Considering that $D_k = R_k \cdot K_k$, solving the optimization problem leads to:

$$R_k = \frac{d_k + \frac{1 - \sum_{i=1}^{N} d_i/K_i}{\sum_{i=1}^{N} 1/K_i}}{K_k}.$$

In a particular embodiment where plural moving conveyances MC 140, 141 are considered and further where the incremental mode is used, optimizing the difference between the distance $d_k$ and the distance $D_k$ is also performed under the constraint that the same gap $D_k$–$d_k$ is achieved for all the moving conveyances MC 140, 141. This constraint means that the same quantity of extra obstacle detection data applies for all the moving conveyances MC 140, 141. This might also be expressed as the following optimization problem:

$$\max_{\{R_k\}} \min_k (D_k - d_k) \text{ such that } \sum_{i=1}^{N} R_i = 1.$$

Considering that $D_k = DL_k \cdot R_k \cdot K_k$, solving the optimization problem leads to:

$$R_k = \frac{d_k - DL_k + \frac{1 - \sum_{i=1}^{N} (DL_i - d_i)/K_i}{\sum_{i=1}^{N} 1/K_i}}{K_k}.$$

In a step S306, the server SERV 120 performs allocation of the downlink transmission resources $DR_k = R_k \cdot R_{tot}$, for each moving conveyance MC 140, 141, in accordance with optimization performed in the step S305.

In a step S307, the server SERV 120 retrieves from the database DB 150 the obstacle detection enhancement data to be transmitted in the transmission cycle $C_n$. When the start of the transmission cycle $C_n$ is reached, the server SERV 120 transmits the retrieved obstacle detection enhancement data to the at least one on-board wireless radio unit OWRU 160, 161 of the respective at least one moving conveyance MC 140, 141. The quantity of obstacle detection enhancement data intended for the obstacle detection system ODS 170, 171 of each respective moving conveyance MC 140, 141 is limited to the downlink transmission resources $DR_k$ for said moving conveyance MC 140, 141. The obstacle detection enhancement data are then processed as detailed hereafter with respect to FIG. 4.

Figure 4:
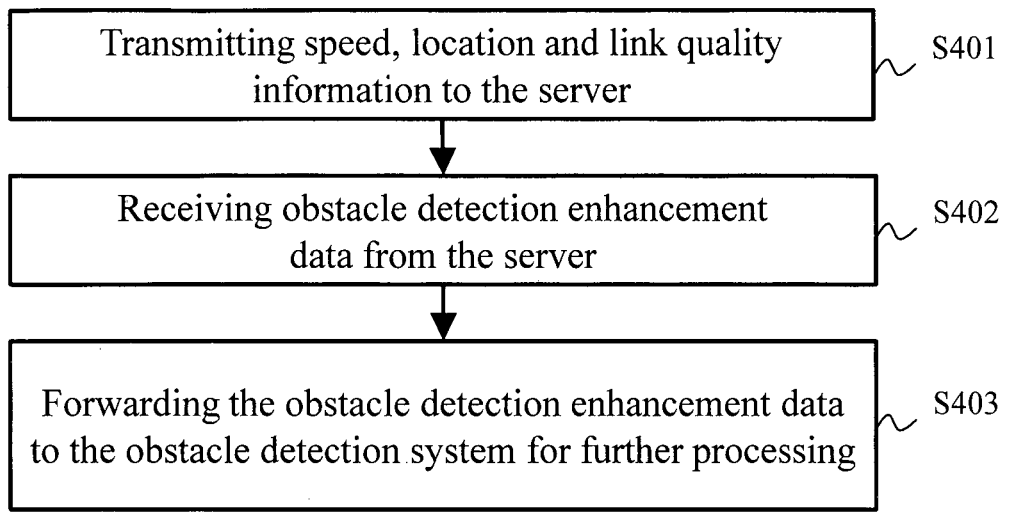
FIG. 4 schematically represents an algorithm for obtaining and processing the obstacle detection enhancement data.

FIG. 4 schematically represents an algorithm for obtaining and processing the obstacle detection enhancement data. The algorithm of FIG. 4 is implemented by the on-board wireless radio unit OWRU 160, 161 of each respective moving conveyance MC 140, 141.

In a step S401, said on-board wireless radio unit OWRU 160, 161 obtains and transmits to the server SERV 120 information on actual speed of the moving conveyance MC 140, 141 in question. The on-board wireless radio unit OWRU 160, 161 in question obtains such information for instance from a GPS (Global Positioning System) device or a speedometer installed in the concerned moving conveyance MC 140, 141.

Said on-board wireless radio unit OWRU 160, 161 may further obtain and transmit to the server SERV 120 information on actual location of the concerned moving conveyance MC 140, 141 on the predefined path 130, 131 on which said moving conveyance MC 140, 141 is travelling. Said on-board wireless radio unit OWRU 160, 161 may obtain such information for instance from a GPS (Global Positioning System) device installed in the concerned moving conveyance MC 140, 141, or from cab signalling.

Said on-board wireless radio unit OWRU 160, 161 may further obtain and transmit to the server SERV 120 information on actual quality $Q_k$ of the wireless link between the server SERV 120 and said on-board wireless radio unit OWRU 160, 161. Said on-board wireless radio unit OWRU 160, 161 may have measured signal-to-noise ratio $SNR_k$ of wireless signals received from the server SERV 120, when the server SERV 120 directly communicates wirelessly with said on-board wireless radio unit OWRU 160, 161. Said on-board wireless radio unit OWRU 160, 161 may have measured signal-to-noise ratio $SNR_k$ of wireless signals received from the wayside wireless radio units $WWRU_0$, $WWRU_1$ 110, when the wayside wireless radio units $WWRU_0$, $WWRU_1$ 110 act as relays between the server SERV 120 and said on-board wireless radio unit OWRU 160, 161.

In a step S402, considering that the step S401 is performed during the transmission cycle $C_{n-1}$, said on-board wireless radio unit OWRU 160, 161 receives in the transmission cycle $C_n$ obstacle detection enhancement data from the server SERV 120. The obstacle detection enhancement data are transmitted in the downlink $DR_k = R_k \cdot R_{tot}$ transmission resources that have been allocated to said on-board wireless radio unit OWRU 160, 161 by the server SERV 120 for the transmission cycle $C_n$, as detailed above.

In a step S403, said on-board wireless radio unit OWRU 160, 161 forwards, to the obstacle detection system ODS 170, 171 of the moving conveyance MC 140, 141 in question, the obstacle detection enhancement data received in the step S402. The obstacle detection system ODS 170, 171 is thus able to enhance obstacle detection at least from the transmission cycle with said obstacle detection enhancement data. Accordingly the obstacle detection system ODS 170, 171 proceeds with enhancing obstacle detection at least from the transmission cycle $C_{n+1}$ with said obstacle detection enhancement data.

The invention claimed is:

1. A method for allocating downlink transmission resources for transmitting obstacle detection enhancement data to at least one on-board wireless radio unit of respective at least one moving conveyance travelling on at least one predefined path, each moving conveyance embedding an obstacle detection system and an on-board wireless radio unit communicating with a server via a wireless link, time being divided in transmission cycles $C_n$ wherein n represents a sequence number, the method being performed by the server and comprising, for each moving conveyance:

obtaining information about actual speed and location of the moving conveyance on one said predefined path and about actual quality $Q_k$ of the wireless link between the server and the on-board wireless radio unit; and allocating downlink transmission resources to the at least one on-board wireless radio unit during each transmission cycle $C_n$, characterized in that the method further comprises, for each moving conveyance:

computing a distance $d_k$ travelled by said moving conveyance during one transmission cycle at the actual speed of said moving conveyance;

estimating location on said predefined path from which the obstacle detection system would need the obstacle detection enhancement data to be transmitted in the transmission cycle $C_n$, from the actual speed and location of said moving conveyance;

requesting to a database storing the obstacle detection enhancement data a volume-to-distance ratio information $b_k$ representing quantity of obstacle detection enhancement data per meter, from said estimated location;

determining the downlink transmission resources to be allocated to the on-board wireless radio unit of said moving conveyance during the transmission cycle $C_n$, by optimizing the difference between the distance $d_k$ and a distance $D_k$ that is covered by the obstacle detection enhancement data made available to the obstacle detection system of said moving conveyance at the start of the transmission cycle $C_{n+1}$, wherein the volume of obstacle detection enhancement data expected to be transmitted during the transmission cycle $C_n$ is determined from the volume-to-distance ratio information $b_k$ and from the actual quality $Q_k$ of said wireless link.

2. The method according to claim 1, wherein the estimated location on said predefined path from which the obstacle detection system would need the obstacle detection enhancement data to be transmitted in the transmission cycle $C_n$ takes into account an estimated braking distance.

3. The method according to claim 1, wherein plural N moving conveyances are considered and wherein optimizing the difference between the distance $d_k$ and the distance $D_k$ is performed under the constraint that the same ratio $D_k/d_k$ is achieved for all the moving conveyances, including determining:

$$R_k = \frac{d_k/K_k}{\Sigma_{i=1}^{N} d_i/K_i}$$

wherein $R_k$ represents a ratio of downlink transmission resources allocated to the moving conveyance identified by k with respect to a total quantity $R_{tot}$ of downlink transmission resources, wherein $D_k = R_k \cdot K_k$ and $K_k = R_{tot} \cdot f(SNR_k)/b_k$ and wherein $f(SNR_k)$ represents the quality $Q_k$ of the wireless link between the on-board wireless radio unit of the moving conveyance identified by k and the server as function of signal-to-noise ratio $SNR_k$ on said wireless link.

4. The method according to claim 1, wherein plural N moving conveyances are considered and wherein optimizing the difference between the distance $d_k$ and the distance $D_k$ is performed under the constraint that the same ratio $D_k/d_k$ is achieved for all the moving conveyances, including determining:

$$R_k = \frac{d_k \frac{1 + \Sigma_{i=1}^{N} DL_i/K_i}{\Sigma_{i=1}^{N} d_i/K_i} - DL_k}{K_k}$$

wherein $R_k$ represents a ratio of downlink transmission resources allocated to the moving conveyance identified by k with respect to a total quantity $R_{tot}$ of downlink transmission resources, wherein $D_k = DL_k + R_k \cdot K_k$ and $K_k = R_{tot} \cdot f(SNR_k)/b_k$, wherein $DL_k$ represents distance ahead said estimated location, for the moving conveyance identified by k, which is covered by the obstacle detection enhancement data transmitted to the on-board wireless radio unit of said moving conveyance identified by k up to the end of the transmission cycle $C_{n-1}$, and wherein $f(SNR_k)$ represents the quality $Q_k$ of the wireless link between the on-board wireless radio unit of the moving conveyance identified by k and the server as a function of signal-to-noise ratio $SNR_k$ on said wireless link.

5. The method according to claim 1, wherein plural N moving conveyances are considered and wherein optimizing the difference between the distance $d_k$ and the distance $D_k$ is performed under the constraint that the same gap $D_k - d_k$ is achieved for all the moving conveyances, including determining:

$$R_k = \frac{d_k + \frac{1 - \Sigma_{i=1}^{N} d_i/K_i}{\Sigma_{i=1}^{N} 1/K_i}}{K_k}$$

wherein $R_k$ represents a ratio of downlink transmission resources allocated to the moving conveyance identified by k with respect to a total quantity $R_{tot}$ of downlink transmission resources, wherein $D_k = R_k \cdot K_k$ and $K_k = R_{tot} \cdot f(SNR_k)/b_k$, and wherein $f(SNR_k)$ represents the quality $Q_k$ of the wireless link between the on-board wireless radio unit of the moving conveyance identified by k and the server as a function of signal-to-noise ratio $SNR_k$ on said wireless link.

6. The method according to claim 1, wherein plural N moving conveyances are considered and wherein optimizing the difference between the distance $d_k$ and the distance $D_k$ is performed under the constraint that the same gap $D_k - d_k$ is achieved for all the moving conveyances, including determining:

$$R_k = \frac{d_k - DL_k + \frac{1 - \sum_{i=1}^{N}(DL_i - d_i)/K_i}{\sum_{i=1}^{N} 1/K_i}}{K_k}$$

wherein $R_k$ represents a ratio of downlink transmission resources allocated to the moving conveyance identified by k with respect to a total quantity $R_{tot}$ of downlink transmission resources, wherein $D_k = DL_k + R_k \cdot K_k$ and $K_k = R_{tot} \cdot f(SNR_k)/b_k$ wherein $DL_k$ represents distance ahead said estimated location, for the moving conveyance identified by k, which is covered by the obstacle detection enhancement data transmitted to the on-board wireless radio unit of said moving conveyance identified by k up to the end of the transmission cycle $C_{n-1}$, and wherein $f(SNR_k)$ represents the quality $Q_k$ of the wireless link between the on-board wireless radio unit of the moving conveyance identified by k and the server as a function of signal-to-noise ratio $SNR_k$ on said wireless link.

7. The method according to claim 1, wherein the obstacle detection enhancement data are 3D scene descriptors describing samples of a 3D scene of environment surrounding the at least one predefined path.

8. A method for transmitting obstacle detection enhancement data to at least one on-board wireless radio unit of respective at least one moving conveyance travelling on at least one predefined path, wherein the method being performed by the server and comprises allocating downlink transmission resources according to claim 1 and further:

retrieving from the database the obstacle detection enhancement data to be transmitted in the transmission cycle $C_n$; and when the start of the transmission cycle $C_n$ is reached, transmitting the retrieved obstacle detection enhancement data to the at least one on-board wireless radio unit in the respectively allocated downlink transmission resources.

9. A computer program product comprising program code instructions that can be loaded in a programmable device for implementing the method according to claim 1, when the program code instructions are run by the programmable device.

10. A computer program product comprising program code instructions that can be loaded in a programmable device for implementing the method according to claim 8, when the program code instructions are run by the programmable device.

11. A non-transitory information storage medium storing a computer program comprising program code instructions that can be loaded in a programmable device for implementing the method according to claim 1, when the program code instructions are read from the non-transitory information storage medium and run by the programmable device.

12. A non-transitory information storage medium storing a computer program comprising program code instructions that can be loaded in a programmable device for implementing the method according to claim 8, when the program code instructions are read from the non-transitory information storage medium and run by the programmable device.

13. A server configured for allocating downlink transmission resources for transmitting obstacle detection enhancement data to at least one on-board wireless radio unit of respective at least one moving conveyance travelling on at least one predefined path, each moving conveyance embedding an obstacle detection system and an on-board wireless radio unit communicating with a server via a wireless link, time being divided in transmission cycles $C_n$ wherein n represents a sequence number, the server comprising electronic circuitry configured, for each moving conveyance, for:

obtaining information about actual speed and location of the moving conveyance on one said predefined path and about actual quality $Q_k$ of the wireless link between the server and the on-board wireless radio unit; and allocating downlink transmission resources to the at least one on-board wireless radio unit during each transmission cycle $C_n$, characterized in that the electronic circuitry is further configured, for each moving conveyance, for:

computing a distance $d_k$ travelled by said moving conveyance during one transmission cycle at the actual speed of said moving conveyance;

estimating location on said predefined path from which the obstacle detection system would need the obstacle detection enhancement data to be transmitted during the transmission cycle $C_n$, from the actual speed and location of said moving conveyance;

requesting to a database storing the obstacle detection enhancement data a volume-to-distance ratio information $b_k$ representing quantity of obstacle detection enhancement data per meter, from said estimated location;

determining the downlink transmission resources to be allocated to the on-board wireless radio unit of said moving conveyance during the transmission cycle $C_n$, by optimizing the difference between the distance $d_k$ and a distance $D_k$ that is covered by the obstacle detection enhancement data made available to the obstacle detection system of said moving conveyance at the start of the transmission cycle $C_{n+1}$, wherein the volume of obstacle detection enhancement data expected to be transmitted during the transmission cycle $C_n$ is determined from the volume-to-distance ratio information $b_k$ and from the actual quality $Q_k$ of said wireless link.

14. A server configured for transmitting obstacle detection enhancement data to at least one on-board wireless radio unit of respective at least one moving conveyance travelling on at least one predefined path, wherein the server is configured according to claim 13 for allocating downlink transmission resources and wherein the electronic circuitry of said server is further configured for:

retrieving from the database the obstacle detection enhancement data to be transmitted in the transmission cycle $C_n$; and when the start of the transmission cycle $C_n$ is reached, transmitting the retrieved obstacle detection enhancement data to the at least one on-board wireless radio unit in the respectively allocated downlink transmission resources.

* * * * *